(12) United States Patent
Winberg et al.

(10) Patent No.: US 8,452,150 B2
(45) Date of Patent: May 28, 2013

(54) FIBER CLAMP MECHANISM FOR AN OPTICAL FIBER PREPARATION TOOL

(75) Inventors: Paul N. Winberg, Rollingwood, TX (US); Donald K. Larson, Cedar Park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 377 days.

(21) Appl. No.: 12/673,869

(22) PCT Filed: Jul. 29, 2008

(86) PCT No.: PCT/US2008/071405
§ 371 (c)(1),
(2), (4) Date: Feb. 17, 2010

(87) PCT Pub. No.: WO2009/035776
PCT Pub. Date: Mar. 19, 2009

(65) Prior Publication Data
US 2011/0026896 A1    Feb. 3, 2011

Related U.S. Application Data

(60) Provisional application No. 60/972,118, filed on Sep. 13, 2007.

(51) Int. Cl.
*G02B 6/00* (2006.01)
*G02B 6/38* (2006.01)
*G02B 6/36* (2006.01)
*G02B 6/255* (2006.01)

(52) U.S. Cl.
USPC ............... 385/137; 385/62; 385/81; 385/86; 385/97; 385/136

(58) Field of Classification Search
USPC .................. 385/62, 81, 86, 97, 98, 134, 136, 385/137
See application file for complete search history.

(56) References Cited

U.S. PATENT DOCUMENTS 5,102,212 A * 4/1992 Patterson ..................... 385/98
6,095,695 A * 8/2000 Ohtsuka et al. ............... 385/72
(Continued)

FOREIGN PATENT DOCUMENTS

| JP | 3445479 B2 | 6/2003 |
| JP | 2007-121888 | 5/2007 |
| KR | 10-2000-032380 A | 6/2000 |
| WO | WO 00/75704 | 12/2000 |
| WO | WO 2006/019515 | 2/2006 |
| WO | WO 2006/019516 | 2/2006 |

*Primary Examiner* — Brian Healy
*Assistant Examiner* — Hung Lam
(74) *Attorney, Agent, or Firm* — Gregg H. Rosenblatt

(57) ABSTRACT

An optical fiber holder assembly for holding an optical fiber having any one of several different fiber constructions comprises a base and a fiber clamping mechanism. The clamping mechanism includes a clamping portion configured to clamp the optical fiber, the clamping portion including a first clamping plate hingedly coupled to a portion of the base. A first fiber entrance guide is formed in an entrance end of the fiber clamping mechanism to receive and guide the optical fiber to a first fiber channel formed in the base. A second fiber entrance guide is formed in the entrance end of the fiber clamping mechanism to receive and guide the optical fiber to a second fiber channel formed in the base. The first clamping portion includes first and second compliant gripping pads, the first gripping pad disposed on the base and the second gripping pad disposed in the first clamping plate such that the gripping pads overlap each other when the first clamping plate is placed in a closed position.

12 Claims, 8 Drawing Sheets

U.S. PATENT DOCUMENTS

| | | |
|---|---|---|
| 6,695,491 B1 | 2/2004 | Leeman et al. |
| 2006/0067637 A1 | 3/2006 | Carpenter et al. |
| 2007/0104425 A1 | 5/2007 | Larson et al. |
| 2007/0104445 A1 * | 5/2007 | Larson et al. ............... 385/134 |

* cited by examiner

FIBER CLAMP MECHANISM FOR AN OPTICAL FIBER PREPARATION TOOL

CROSS REFERENCE TO RELATED APPLICATIONS

This application is a national stage filing under 35 U.S.C. 371 of PCT/US2008/071405, filed Jul. 29, 2008, which claims priority to U.S. Provisional Application No. 60/972,118, filed Sep. 13, 2007, the disclosure of which is incorporated by reference in its/their entirety herein.

BACKGROUND OF THE INVENTION

1. Field of the Invention

The present invention is directed to an optical fiber clamp mechanism.

2. Related Art

Mechanical optical fiber connectors for the telecommunications industry are known. For example, LC, ST, FC, and SC optical connectors are widely used.

However, commercially available optical connectors are not well suited for field installations. Typically, an adhesive is required to mount these types of connectors on to an optical fiber. This process can be awkward and time consuming to perform in the field. Also post-assembly polishing requires that the craftsman have a higher degree skill.

Also known are hybrid optical splice connectors, as described in JP Patent No. 3445479, JP Application No. 2004-210251 (WO 2006/019516) and JP Application No. 2004-210357 (WO 2006/019515). However, these hybrid splice connectors are not compatible with standard connector formats and require significant piecewise assembly of the connector in the field. The handling and orientation of multiple small pieces of the connector can result in incorrect connector assembly that may either result in decreased performance or increase the chance of damaging the fiber.

Also known are optical fiber connectors of compact length that are capable of straightforward field termination using a field termination platform. For example, an optical connector and field termination platform are described in co-owned, pending U.S. Publication Nos. 2007/0104445 A1 and 2007/0104425 A1, incorporated by reference in their entirety.

SUMMARY OF THE INVENTION

According to a first aspect of the present invention, an optical fiber holder assembly for holding an optical fiber having any one of several different fiber constructions comprises a base and a fiber clamping mechanism. The clamping mechanism includes a clamping portion configured to clamp the optical fiber, the clamping portion including a clamping plate hingedly coupled to a portion of the base. A first fiber entrance guide is formed in an entrance end of the fiber clamping mechanism to receive and guide the optical fiber to a first fiber channel formed in the base. A second fiber entrance guide is formed in the entrance end of the fiber clamping mechanism to receive and guide the optical fiber to a second fiber channel formed in the base. The first clamping portion includes first and second compliant gripping pads, the first gripping pad disposed on the base and the second gripping pad disposed in the first clamping plate such that the gripping pads overlap each other when the clamping plate is placed in a closed position.

In another aspect, the fiber holder assembly base is generally planar and is configured to be slidably received in a channel or other receptacle of an optical fiber preparation tool. In one aspect, the optical fiber preparation tool is an optical fiber connector termination platform.

In another aspect, the fiber holder assembly further includes a fiber constraint portion configured to constrain the optical fiber, the fiber constraint portion including a constraint plate hingedly coupled to the base. The fiber constraint portion can include one or more fiber guides disposed on the base to keep the optical fiber in place prior to actuation of the constraint plate. The constraint plate constrains the fiber when in a closed position using gravity to retain the optical fiber.

In another aspect, the fiber clamping and constraint portions can each include one or more aligned fiber guides or channels to provide more axial support of the fiber along a substantial distance of the platform.

In another aspect, the compliant pads are formed from a resilient, deformable material.

In another aspect, the first and second fiber entrance guides are separated by a prominent divider that aids the user in placement of the fiber in the proper channel.

In another aspect, the end portion of the base further includes an extension portion that includes first and second identifiers to provide first and second symbols of first and second fiber types, the first identifier disposed near the first fiber entrance guide and the second identifier disposed near the second fiber entrance guide.

In another aspect, the clamping portion places a compressive force of about 3 to about 10 pounds on an optical fiber received in the first entrance fiber guide. In yet another aspect, the clamping portion places a compressive force of about 15 to about 25 pounds on an optical fiber received in the second entrance fiber guide.

According to another aspect of the present invention, an optical fiber holder assembly for holding an optical fiber having any one of several different fiber constructions comprises a base and a fiber clamping mechanism. The clamping mechanism includes a clamping portion configured to clamp the optical fiber, the clamping portion including a clamping plate hingedly coupled to a portion of the base. The clamping portion also includes a fiber entrance guide formed in an entrance end of the fiber clamping mechanism to receive and guide the optical fiber to a fiber channel having an adjustable channel depth formed in the base. The clamping portion also includes first and second compliant gripping pads, the first gripping pad disposed on the base and the second gripping pad disposed in the first clamping plate such that the gripping pads overlap each other and place a compressing force on the fiber when the clamping plate is placed in a closed position.

In this alternative aspect, the fiber clamping mechanism includes an adjustable lever mechanism to provide the adjustable channel depth. In one aspect, the lever mechanism includes a handle and rod portion. The rod portion extends along the length of the fiber channel and is cammed in order to change the depth of the fiber channel. The handle portion is disposed proximate to the fiber entrance guide and is rotatable between at least a first position and a second position. When the handle is placed in a first position, the fiber channel has a first channel depth and when the handle is placed in a second position, the fiber channel has a second channel depth.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1A:
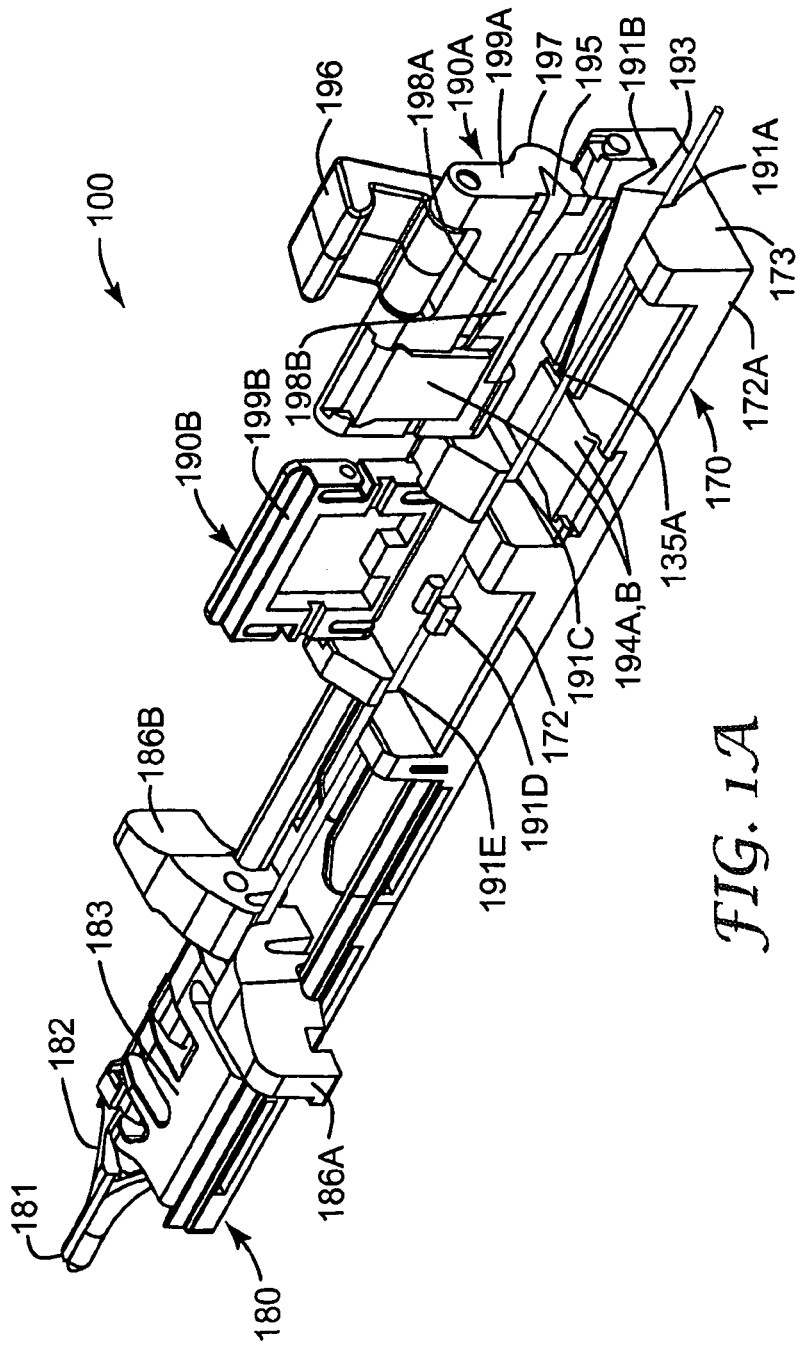
FIG. 1A is an isometric view of a fiber holder assembly having a fiber clamping mechanism according to an aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

The present invention is directed to an optical fiber clamp mechanism. In particular, an optical fiber holder assembly is provided having an optical fiber clamping mechanism that is designed to secure several different types of conventional optical fibers. For example, the optical fiber clamping mechanism provides axial position control of a 250 μm coated fiber or a 900 μm coated fiber. In addition, this optical fiber clamping mechanism can also properly secure most, if not all 900 μm coated fibers with varying degrees of coating tightness, from tight construction to loose-tube construction.

The optical fiber clamping mechanism described herein can control the inner fiber position while preventing damage to the buffer coating and cladding/core of a full range of optical fiber types. The optical fiber holder assembly can be incorporated as part of an optical fiber preparation tool. As described herein, an optical fiber preparation tool can be part of a fiber cleaving platform, a fiber splicing platform, a fiber polishing platform, or a fiber connector termination platform, preferably used for in-the-field fiber preparation applications. Moreover, the optical fiber clamping mechanism can secure the fiber to maintain proper strip, cut and cleave lengths.

FIG. 1A shows a fiber holder assembly 100 that includes an exemplary fiber clamping mechanism 170 formed on a fiber holder assembly base 172. In a preferred aspect, the generally planar, fiber holder assembly base 172 is configured to be slidably received in a channel or other receptacle of an optical fiber preparation tool (See e.g., FIGS. 5 and 6). In one preferred aspect, the optical fiber preparation tool comprises a field termination platform that can be constructed as is described in publication nos. 2007/0104445 A1 and 2007/0104425 A1, specifically the description of field termination platform 400 therein, incorporated by reference in their entirety above.

According to an exemplary aspect of this embodiment, fiber holder assembly 100, and components thereof, can be formed or molded from a polymer material, although metal and other suitably rigid materials can also be utilized.

As shown in FIG. 1A, fiber clamping mechanism 170 includes a fiber clamping portion 190A and fiber constraint portion 190B. The fiber clamping portion is provided to support and temporarily secure an optical fiber, such as optical fiber 135A, during a stripping, cleaving, polishing or termination process. The fiber clamping portion and fiber constraint portion can each include one or more aligned fiber guides or channels to provide more axial support of the fiber along a substantial distance of the platform. For example, fiber guides or channels 191A-E can be provided.

The fiber clamping portion 190A is configured to clamp a variety of conventional optical fibers. Optical fiber cables used for data transmission are typically made with a glass fiber diameter of 125 μm formed by the core and cladding portions of the optical fiber. These fibers are then coated with a first buffer coating, such as an acrylate coating to an outer diameter of about 250 μm to protect the fiber clad/core and provide higher visibility and ease of use. A second buffer coating is sometimes employed having an approximately 900 μm outer diameter. This second buffer coating can provide improved overall strength and durability for the optical fiber. The chemical makeup of this second (or outer) buffer coating can vary for different types of fiber. For example, conventional materials such as Nylon, polyvinyl chloride, PVC and thermoplastic polyester elastomer (e.g., HYTREL, a registered mark of Dupont) may be utilized. In addition, the second buffer coating may be tightly adhered to the first buffer coating or it may bound an air gap disposed between the first and second buffers. For purposes of this application, all such structures are referred to herein as optical fibers.

Figure 8A:
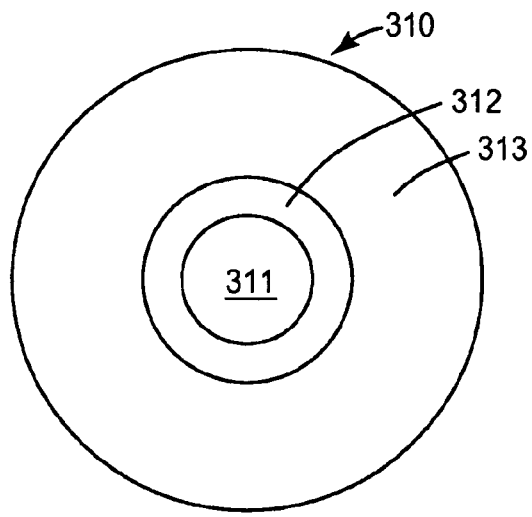
FIGS. 8A, 8B, and 8C show schematic cross section views of different fiber types that can be clamped by the fiber clamping mechanism.
Figure 8B:
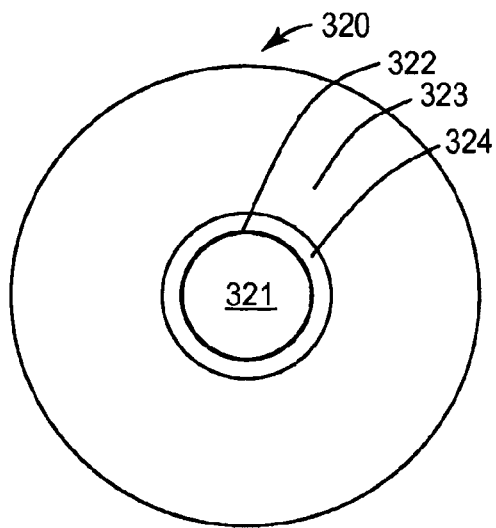
Figure 8C:
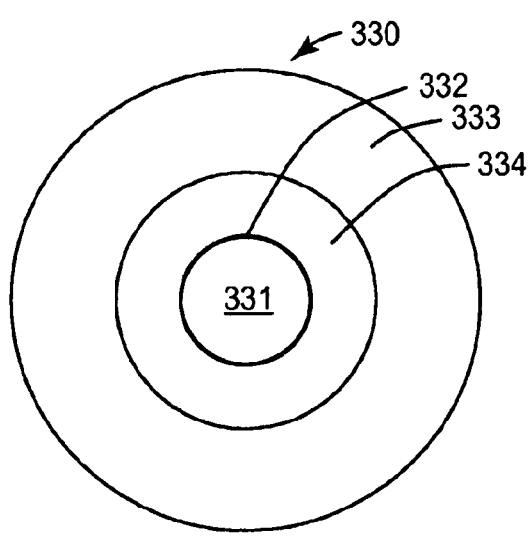

For example, FIG. 8A shows a cross section view of an exemplary "tight" fiber structure 310, where the clad/core and first buffer 311 (e.g., epoxy-acrylate) are surrounded by a buffer coating 312 of silicone (with an outer diameter of about 400 μm), which in turn is surrounded by a further buffer coating of HYTREL (with an outer diameter of about 900 μm). In this example, buffer 312 is tightly adhered to the core/Clad-first buffer 311, and the buffer 313 is tightly adhered to buffer 312. FIG. 8B shows a cross section view of an exemplary "semi-tight" fiber structure 320, where the clad/core and first buffer 321 (epoxy-acrylate) are surrounded by (about) a 50 μm air gap 324. The air gap 324 is radially bounded by a buffer coating 323 of HYTREL (with an outer diameter of about 900 μm). In this example, a surface 322 of the core/clad-first buffer 321 can be coated with a material, such as a talcum powder, that prevents adherence of buffer 323 to surface 322. FIG. 8C shows a cross section view of an exemplary "loose-tube" fiber structure 330, where the clad/core and first buffer 331 (epoxy-acrylate) are surrounded by (about) a 250 µm air gap 334. The air gap 334 is radially bounded by an outer buffer coating 333 of Nylon or HYTREL (with an outer diameter of about 900 µm). In this example, a surface 332 of the core/clad-first buffer 331 can be coated with a material, such as a Talcum powder, that prevents adherence of outer buffer 333 to surface 332. Other conventional optical fibers, such as fibers having an outer diameter of 250 µm, are also clamped by the clamping mechanism described herein.

For fiber with a loose-tube buffer, even a modest pulling axial force during a fiber stripping or cleaving process can cause the fiber (i.e. the clad/core portion and inner buffer) to pull away from the 900 µm outer buffer by several millimeters. For example, when working with loose-tube buffer coatings, the clad/core and first buffer portions of the fiber may not be well constrained against axial motion within the buffer. If, for example, 2 inches of the outer buffer is removed from the fiber, and the first buffer portion (surrounding the core/clad) is grasped, the first buffer portion (and the clad/core portion) can be moved axially in or out of the buffer by an amount exceeding 1/10 of an inch or more.

However, too much radial (compressive) force placed on a particular fiber buffer can cause de-lamination at the clad-buffer or buffer-buffer interface. Accordingly, different clamping forces are appropriate depending on the type of fiber being prepared.

To address these variations in fiber construction, an entrance end 173 of the fiber clamping mechanism 170 can include one or more fiber entrance guides to receive an optical fiber. In the exemplary aspect of FIG. 1A, fiber clamping mechanism 170 includes a first entrance fiber guide 191A and second entrance fiber guide 191B. The entrance guides can be separated by a prominent divider structure 193 that aids the user in proper placement of the fibers. The fiber entrance guides help guide the particular fiber into the appropriate fiber channel 177A, 177B (see FIG. 1B) that is disposed in the base portion of the clamping mechanism. While only two entrance fiber guides are shown in FIG. 1A, alternatives of the fiber clamping mechanism may include additional fiber entrance guides, as would be apparent to one of ordinary skill in the art given the present description.

Each of the entrance fiber guides is configured to receive one or more different types of fiber. For example, first fiber entrance guide 191A can be configured to receive 250 µm optical fibers and 900 µm fibers having a tight or semi-tight construction. In addition, second fiber entrance guide 191B can be configured to receive 900 µm fibers having a loose-tube construction. As is further shown in the end view of FIG. 1C, prominent divider structure 193 divides the first fiber entrance guide 191A from the second fiber entrance guide 191B. The depth of the first fiber channel 177A (corresponding to the distance between the bottom of the guide channel to a lower surface of the clamping plate 199A), which receives the fiber inserted in the first fiber entrance guide 191A, preferably can have a first channel depth (d1) of about 0.71 mm to about 0.74 mm. The depth of the second fiber channel 177B, which receives the fiber inserted in the second fiber entrance guide 191B, preferably can have a second channel depth (d2) of about 0.63 mm to about 0.66 mm. For example, for a conventional loose-tube construction fiber (with a 900 µm outer diameter) disposed in second fiber channel 177B, an applied compression force of about 15 lbs. to about 25 lbs. is applied to the fiber by the fiber clamping mechanism.

Figure 1B:
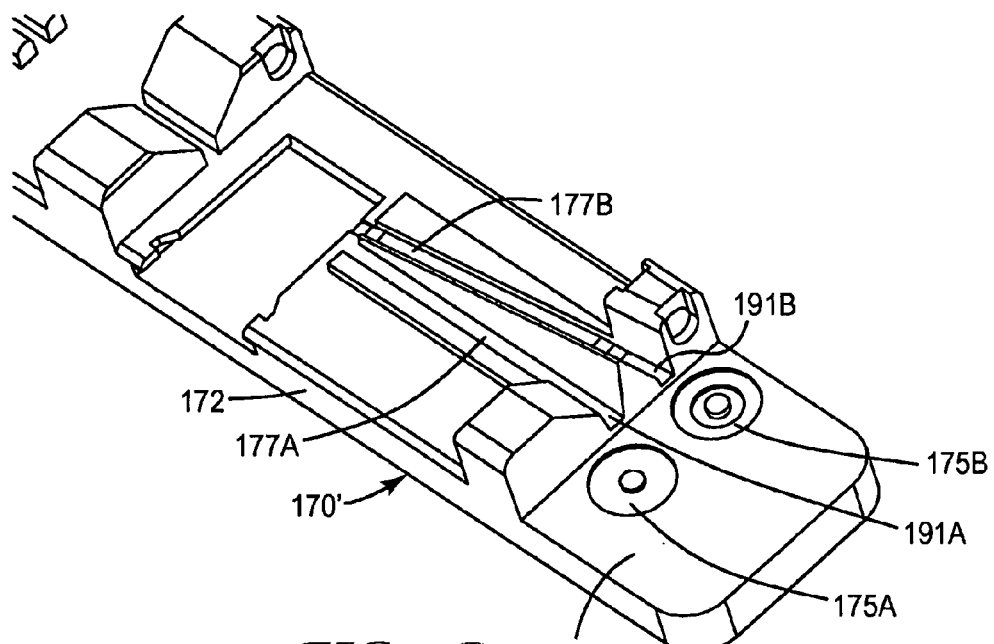
FIG. 1B is an isometric partial view of a base portion of a fiber clamping assembly according to an alternative aspect of the invention.
Figure 1C:
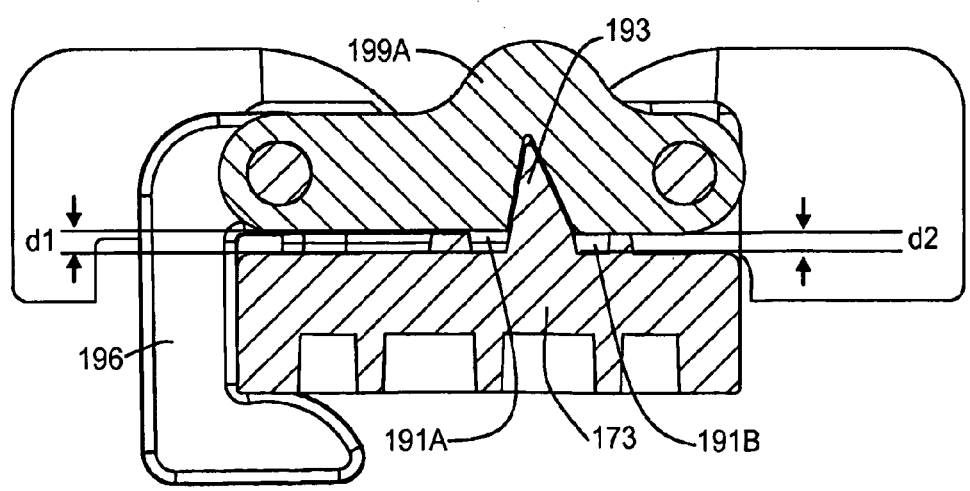
FIG. 1C is a cross section view of a fiber holder assembly having a fiber clamping mechanism according to an aspect of the invention.

In another preferred aspect, such as shown in FIG. 1B, which shows a partial view of an alternative fiber clamping mechanism 170', an end portion of platform base 172 can further include an extension portion 174 that includes identifiers 175A and 175B. These identifiers can be symbols or the like which assist the user in placement of a particular fiber type in the proper entrance fiber guide 191A or 191B. The fiber can rest in the appropriate channel 177A or 177B prior to clamping. As mentioned above, in a preferred aspect, channels 177A and 177B can have different channel depths.

To accomplish clamping of the optical fiber, clamping portion 190A further includes a clamping plate 199A. In a preferred aspect, clamping plate 199A is coupled to the base 172 via a conventional hinge or the like. The clamping plate 199A provides a compressing force to an optical fiber disposed in channel 177A. In a preferred aspect, the clamping plate engages with the base 172 via the latch 196 to keep the clamping portion 190A in a closed position. The clamping plate can also include a groove 195 to accommodate the prominent divider 193 and an outer hump 197 to provide strength and structural support for the clamping plate.

For example, for a tight or semi-tight construction fiber with a 900 µm outer diameter retained in channel 177A, a plate surface 198A contacts the fiber when the clamping plate is latched in the closed position. Further, for a loose-tube construction fiber with a 900 µm outer diameter retained in second channel 177B, a second plate surface 198B contacts the fiber when the clamping plate is latched in the closed position.

To clamp smaller fibers, such as an optical fiber with a 250 µm outer diameter, clamping portion 190A further includes compliant gripping pads 194A and 194B. In a preferred aspect, the pads are disposed on the base 172 and clamping plate 199A, respectively. In a preferred aspect, the gripping pads 194A, 194B overlap one another when the clamping plate 199A is placed in a closed position. The pads 194A, 194B are formed from a resilient, deformable material. For example, in one aspect, pads 194A, 194B are formed from a commercially available NBR material (nitrile butadiene rubber, having a Shore A durometer value of about 70).

In operation, for an optical fiber with a 250 µm outer diameter, the optical fiber is gripped by the pads 194A, 194B when plate 199A is placed in a closed position. In a preferred aspect, the pads are of sufficient compliance so as not to damage a fiber's outer coating, while at the same time possessing adequate resilience to return to its form after a larger buffer fiber (e.g., a 900 µm) is clamped and released.

Based on the configuration described above, the clamping portion 190A provides adequate resistance to an axial pulling of the fiber that occurs during fiber preparation activities. In a preferred aspect, clamping portion 190A places a compressive force of about 3 lbs. to about 10 lbs. on a 900 µm fiber secured in the first fiber channel 177A. In addition, clamping portion 190A can place a different compressive force of about 15 lbs. to about 25 lbs. on a 900 µm fiber secured in second fiber channel 177B. In this manner, the clamping mechanism can immobilize the fiber inside the 900 µm outer buffer coating so that proper fiber preparation (e.g., stripping, cleaving, polishing, and connectorization) can be achieved.

In a preferred aspect, the clamping mechanism 170 can also include a fiber constraint portion 190B, shown in FIG. 1A. Constraint portion 190B can include one or more fiber guides (see e.g., fiber guide 191D) disposed on the base 172 to keep fiber 135A in place prior to actuation of the constraint plate 199B. Constraint plate 199B can be coupled to the base 172 via a conventional hinge or the like. In this implementation, constraint portion 190B can be closed over the fiber to impart a modest constraining force, using gravity to retain the fiber.

Figure 2:
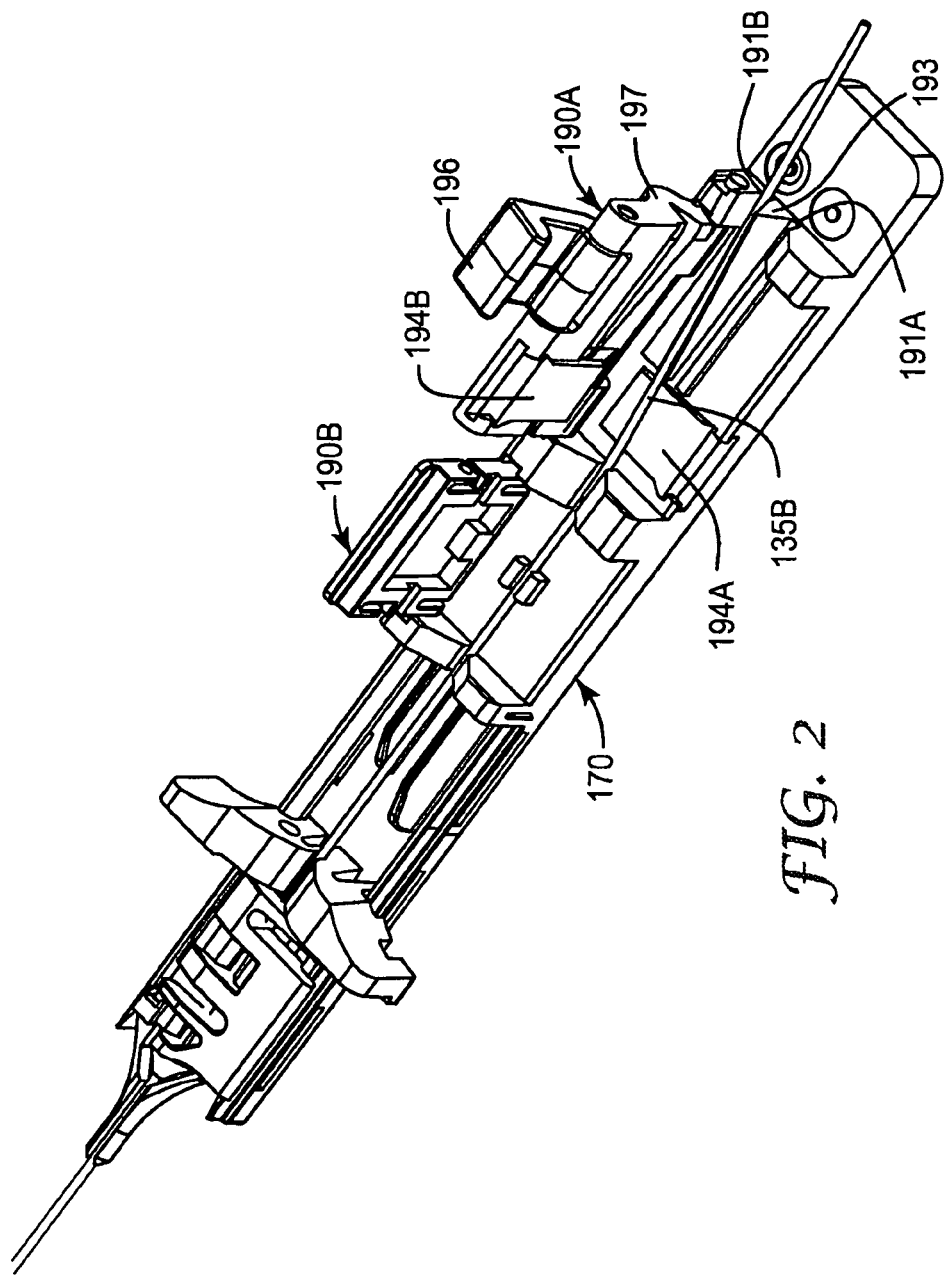
FIG. 2 is an isometric view of a fiber holder assembly having a fiber clamping mechanism according to an aspect of the invention.
Figure 3:
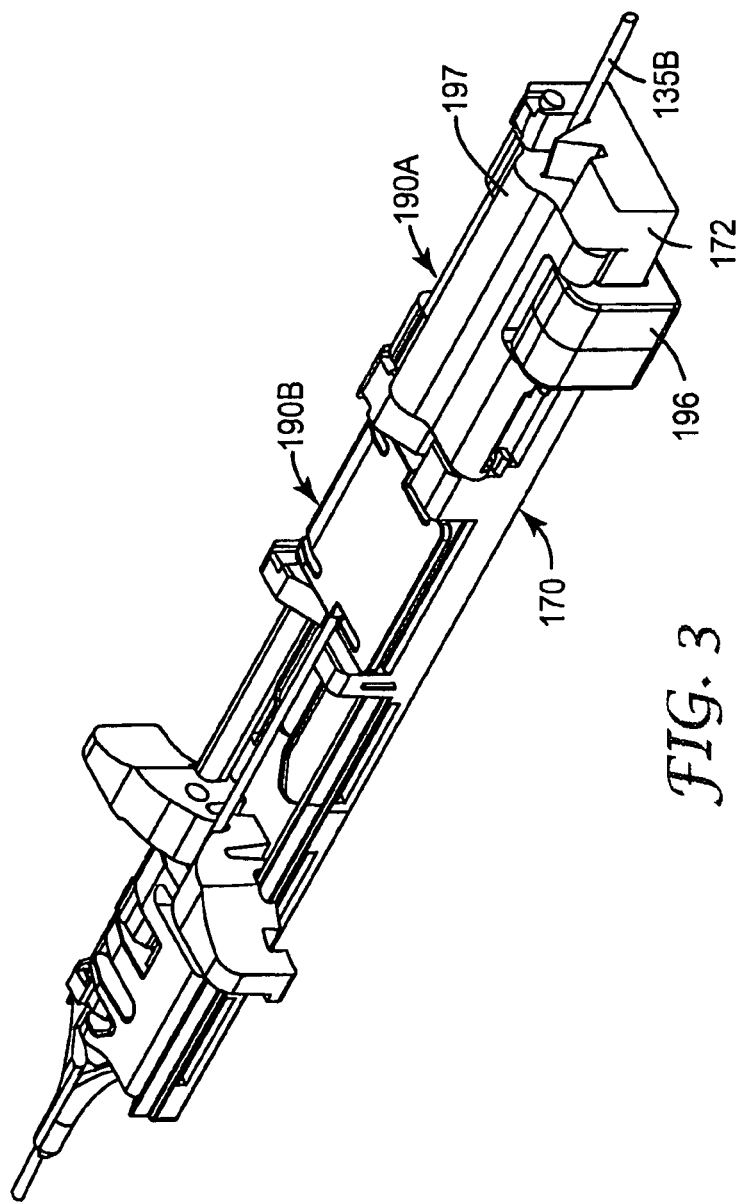
FIG. 3 is an isometric view of a fiber holder assembly having a fiber clamping mechanism in a closed position according to an aspect of the invention.

As mentioned above, to address variations in fiber construction, the fiber clamping mechanism can provide different fiber entrance guides to receive different optical fiber types and optical fiber guiding channels of different depths. In the exemplary aspect of FIG. 1A, fiber clamping mechanism 170 includes a first entrance fiber guide 191A that receives a first type of optical fiber 135A. In addition, as is shown in FIG. 2, fiber clamping mechanism 170 also includes a second entrance fiber guide 191B that receives a second type of optical fiber 135B. As is shown in FIG. 2, clamping portion 190A is of sufficient axial length to accommodate the clamping of a modestly bent optical fiber 135B. FIG. 3 shows clamping mechanism 170 with clamping portion 190A and constraint portion 190B placed in a closed position.

Figure 7:
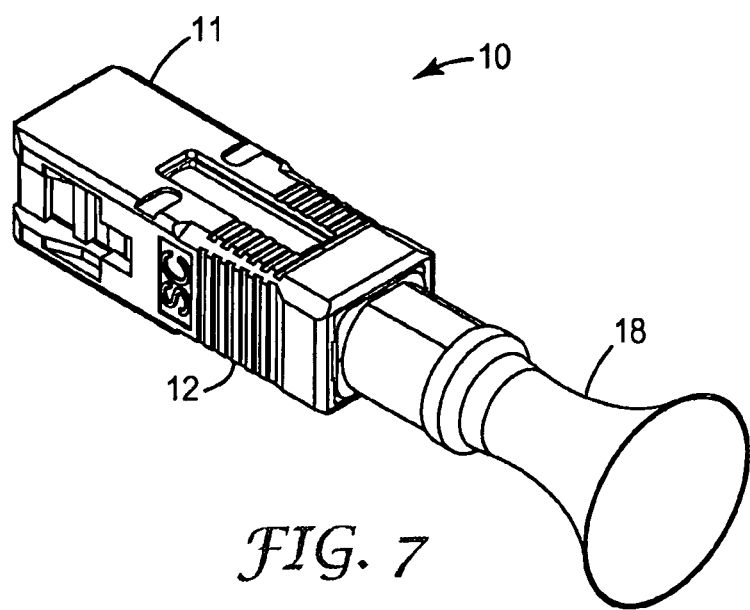
FIG. 7 is an isometric view of an exemplary optical fiber connector.

Optionally, the fiber holder assembly 100 can also include a buffer clamp actuator section 180 that can be integrally formed with the fiber clamping mechanism shown in FIG. 1A. In this exemplary aspect, the buffer clamp actuator section 180 can be designed to engage and actuate a buffer clamp of a field terminable optical fiber connector, such as connector 10 of FIG. 7. Optical connector 10 is preferably configured as having an SC format. In this example, SC-type optical fiber connector 10 can include a connector body 12 having a housing 11 and a fiber boot 18. However, as would be apparent to one of ordinary skill in the art given the present description, optical connectors having other standard formats, such as ST, FC, and LC connector formats can also be utilized.

The buffer clamp actuator section 180 can include a funnel-shaped fiber guide 182 and a tip portion 181 configured to contact a sleeve, or a portion thereof, of the field terminable optical fiber connector. The funnel-shaped portion can provide a guide for a fiber, such as an optical fiber 135A to be inserted into a field terminable optical fiber connector 10. Buffer clamp actuator section 180 can further include a separate fiber holder 183 that can be snapped closed over a fiber when inserted into a field terminable optical fiber connector. Also, clamp actuator 180 can further include handles or lobes 186A and 186B that provide accessible contact points for a user to slide the buffer clamp actuator during fiber termination. Alternative embodiments of the fiber holder assembly may not include the buffer clamp actuator section.

Figure 4A:
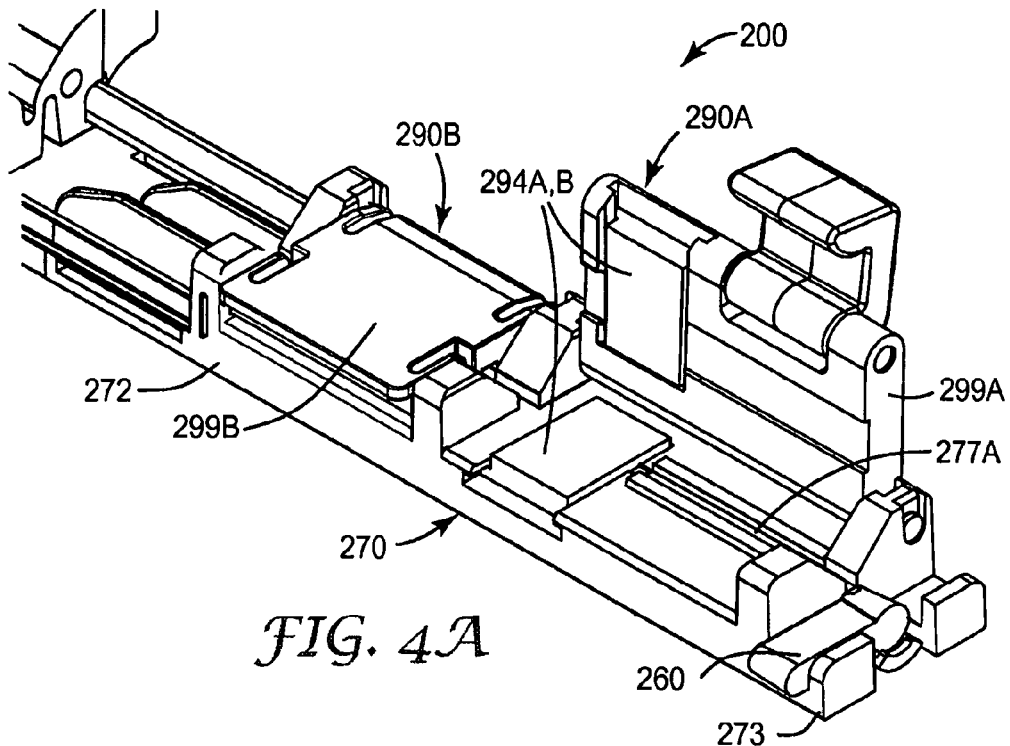
FIG. 4A is an isometric partial view of a fiber holder assembly having a fiber clamping mechanism according to an alternative aspect of the invention.
Figure 4B:
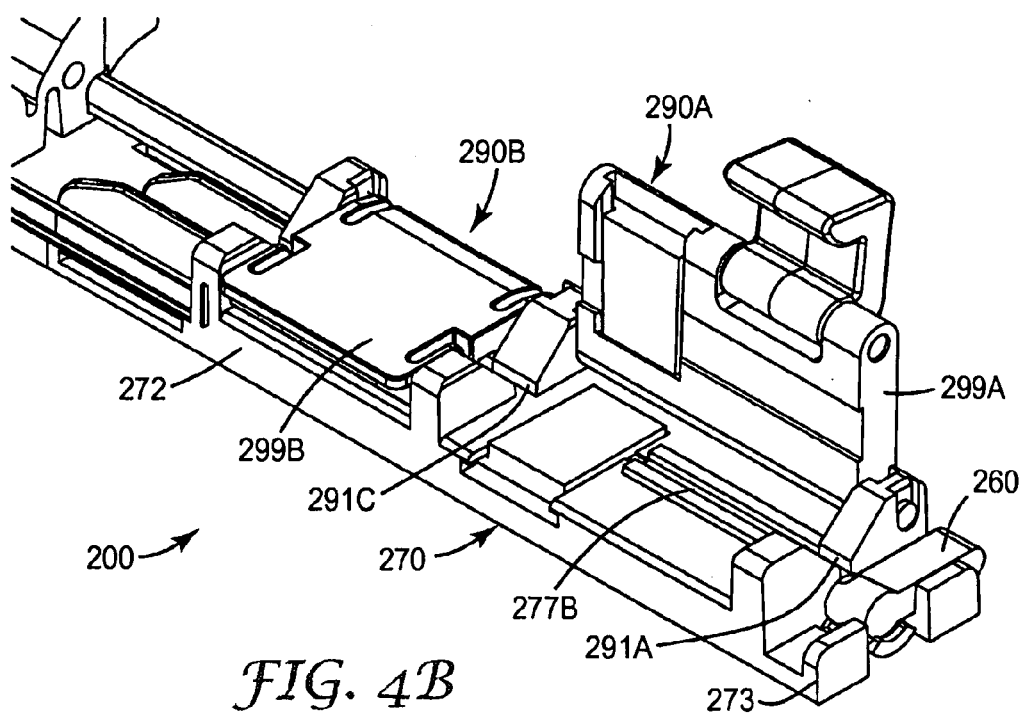
FIG. 4B is another isometric partial view of the fiber holder assembly of FIG. 4A.

FIGS. 4A and 4B show an alternative embodiment of the present invention, a fiber holder assembly 200 that includes an alternative fiber clamping mechanism 270 formed on a fiber holder assembly base 272. The generally planar, fiber holder assembly base 272 is preferably configured to be slidably received in a channel or other receptacle of an optical fiber preparation tool (see e.g., FIGS. 5 and 6). According to an exemplary aspect of this embodiment, fiber holder assembly 200, and components thereof, can be formed or molded from a polymer material, although metal and other suitably rigid materials can also be utilized.

As shown in FIG. 4A, fiber clamping mechanism 270 includes a fiber clamping portion 290A. The fiber clamping portion is provided to support and temporarily secure an optical fiber during a cleaving, stripping, polishing or termination process. The fiber clamping portion can include one or more aligned fiber guides or channels to provide more axial support of the fiber along a substantial distance of the platform. The fiber clamping portion 290A is configured to clamp a variety of conventional optical fibers. In this aspect, fiber clamping portion 290A includes a clamping plate 299A that is configured to impart a compressing force on the received optical fiber. Optionally, a fiber constraint portion 290B can also be provided that includes a constraint plate 299B to place a modest constraint on the held fiber. Fiber guides 291A and 291C and others can be utilized to align the fiber in the clamping mechanism.

As shown in FIGS. 4A and 4B, a single fiber entrance guide 291A is provided at the base end 273. To properly clamp optical fibers of different sizes, a fiber receiving channel is provided with an adjustable guide channel depth disposed in the base 270. In this alternative aspect, an adjustable lever 260 is provided having a handle and rod portion. The rod portion extends along the length of the fiber guide channel and is cammed in order to change the depth of the fiber receiving channel 277A. For example, in FIG. 4A the handle of lever 260 is placed in a first position (pointing to the left side of base end portion 273). In this first position, the rod extends through the fiber receiving channel 277A, giving the channel 277A a first depth. In FIG. 4B, the handle of lever 260 is rotated (pointing to the right side of base end portion 273) so that the rod extends through the fiber receiving channel in a different orientation giving the channel a second depth (the fiber channel is identified as channel 277B in the figure).

In this aspect, when the lever 260 is placed in the first position, the guide channel 277A can be configured to receive 250 μm optical fibers and 900 μm fibers having a tight or semi-tight construction. Alternatively, when the lever 260 is placed in the second position, the guide channel 277B can be configured to receive 900 μm fibers having a loose-tube construction adhered second buffer coating. In an exemplary aspect, when the lever is placed in the first position, the depth of the fiber channel 277A can be from about 0.71 mm to about 0.74 mm. When the lever is placed in the second position, the depth of the second fiber channel 277B can be from about 0.63 mm to about 0.66 mm. The clamped fibers can then withstand axial pulling forces without incurring relative displacement of the clad/core portion of the fiber from the first or second buffer coating (depending on fiber type).

Figure 5:
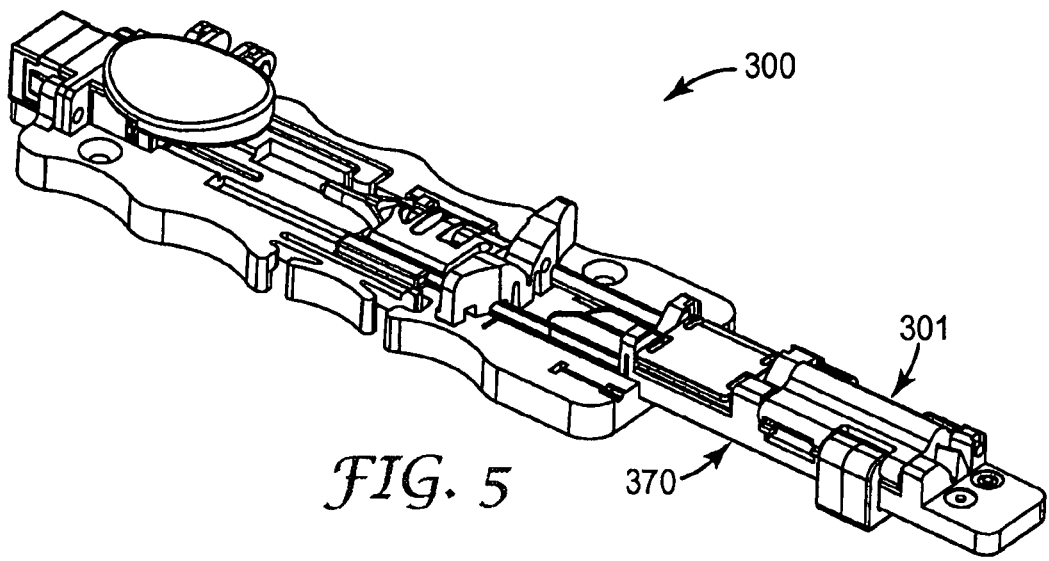
FIG. 5 is an isometric view of a fiber holder assembly having a fiber clamping mechanism according to an aspect of the invention as part of a fiber termination platform.
Figure 6:
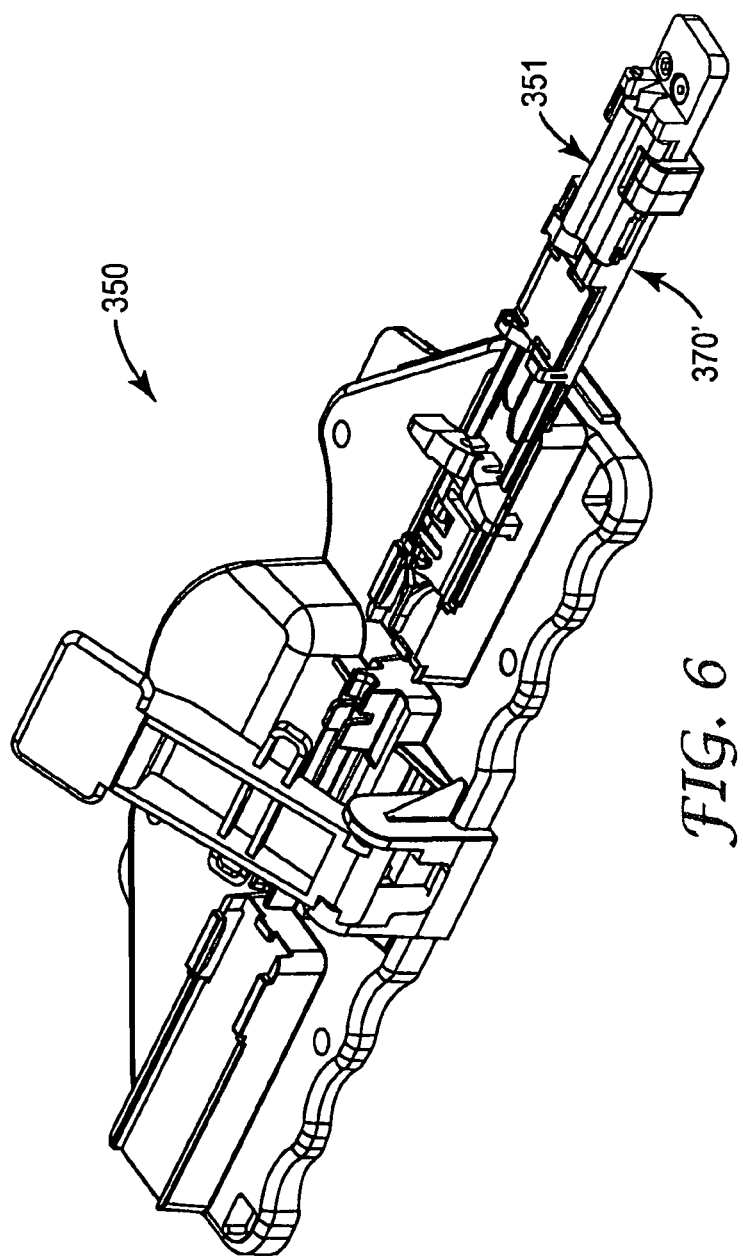
FIG. 6 is an isometric view of fiber holder assembly having a fiber clamping mechanism according to an aspect of the invention as part of an angle cleave mechanical splice assembly tool.

The fiber holder assembly embodiments herein are configured to be utilized with an optical fiber preparation tool. For example, FIG. 5 shows an optical fiber connector field termination platform 300 including a fiber holder assembly 301 that includes a fiber clamping mechanism 370'. In this aspect, the field termination platform 300 can be utilized to terminate an optical fiber in an optical fiber connector during a field installation. In another aspect, as is shown in FIG. 6, an optical fiber angle cleave mechanical splice assembly platform 350 includes a fiber holder assembly 351 that includes a fiber clamping mechanism 370'. In this aspect, the angle cleave assembly platform 350 can be utilized to complete the mechanical splicing of an angle-cleaved optical fiber.

In addition, the fiber clamping mechanism described herein can be utilized as a permanent fiber clamp for optical fiber spicing applications.

Various modifications, equivalent processes, as well as numerous structures to which the present invention may be applicable will be readily apparent to those of skill in the art to which the present invention is directed upon review of the present specification.

We claim:

1. An optical fiber holder assembly for holding an optical fiber having any one of several different fiber constructions, comprising:
    a base; and
    a fiber clamping mechanism, the clamping mechanism including
        a clamping portion configured to clamp an optical fiber, the clamping portion including a clamping plate hingedly coupled to a portion of the base,
        a first fiber entrance guide formed in an entrance end of the fiber clamping mechanism to receive and guide the optical fiber to a first fiber channel formed in the base, a second fiber entrance guide formed in the entrance end of the fiber clamping mechanism to receive and guide the optical fiber to a second fiber channel formed in the base, first and second compliant gripping pads, the first and second gripping pads formed from a material having sufficient resilience to return to its form after a fiber is gripped and released, the first gripping pad disposed on the base and the second gripping pad disposed in the clamping plate such that the gripping pads overlap each other when the clamping plate is placed in a closed position, wherein the entrance end of the base further includes an extension portion that includes first and second identifiers to provide first and second symbols of first and second fiber types, the first identifier disposed near the first fiber entrance guide and the second identifier disposed near the second fiber entrance guide.

2. The optical fiber holder assembly of claim 1, wherein the base comprises a generally planar structure that is configured to be slidably received in a receptacle of an optical fiber preparation tool.

3. The optical fiber holder assembly of claim 2, wherein the optical fiber preparation tool comprises an optical fiber connector termination platform.

4. The optical fiber holder assembly of claim 1, further comprising a fiber constraint portion to constrain the optical fiber, the fiber constraint portion including a constraint plate hingedly coupled to the base.

5. The optical fiber holder assembly of claim 1, comprising one or more aligned fiber guides to provide axial support of the fiber along a substantial distance of the platform.

6. The optical fiber holder assembly of claim 1, wherein the compliant pads are formed from a rubber-based material.

7. The optical fiber holder assembly of claim 1, wherein the first and second fiber entrance guides are separated by a divider structure.

8. The optical fiber holder assembly of claim 1, wherein the clamping portion places a compressive force of from about 3 pounds to about 10 pounds on an optical fiber clamped in the first fiber channel.

9. The optical fiber holder assembly of claim 1, wherein the clamping portion places a compressive force of from about 15 pounds to about 25 pounds on an optical fiber clamped in the second fiber channel.

10. The optical fiber holder assembly of claim 6, wherein the rubber-based material comprises a nitrile butadiene rubber material.

11. An optical fiber holder assembly for holding an optical fiber having any one of several different fiber constructions, comprising:
    a base; and
    a fiber clamping mechanism, the clamping mechanism including
        a clamping portion configured to clamp an optical fiber, the clamping portion including a clamping plate hingedly coupled to a portion of the base,
        a first fiber entrance guide formed in an entrance end of the fiber clamping mechanism to receive and guide the optical fiber to a first fiber channel formed in the base,
        a second fiber entrance guide formed in the entrance end of the fiber clamping mechanism to receive and guide the optical fiber to a second fiber channel formed in the base,
        first and second compliant gripping pads, the first gripping pad disposed on the base and the second gripping pad disposed in the clamping plate such that the gripping pads overlap each other when the clamping plate is placed in a closed position,
        wherein the entrance end of the base further includes an extension portion that includes first and second identifiers to provide first and second symbols of first and second fiber types, the first identifier disposed near the first fiber entrance guide and the second identifier disposed near the second fiber entrance guide.

12. The optical fiber holder assembly of claim 11, wherein the first and second fiber entrance guides are separated by a divider structure.

\* \* \* \* \*